(12) United States Patent
Hsu

(10) Patent No.: US 11,801,412 B2
(45) Date of Patent: Oct. 31, 2023

(54) EXERCISE DEVICE WITH CONTROLLABLE TRAINING MODES

(71) Applicant: GEE HOO FITEC CORP., New Taipei (TW)

(72) Inventor: Ching-Lu Hsu, Taipei (TW)

(73) Assignee: GEE HOO FITEC CORP., New Taipei (TW)

( * ) Notice: Subject to any disclaimer, the term of this patent is extended or adjusted under 35 U.S.C. 154(b) by 182 days.

(21) Appl. No.: 17/375,848

(22) Filed: Jul. 14, 2021

(65) Prior Publication Data

US 2023/0013505 A1 Jan. 19, 2023

(51) Int. Cl.
*A63B 21/015* (2006.01)
*A63B 21/00* (2006.01)
(Continued)

(52) U.S. Cl.
CPC ...... *A63B 21/015* (2013.01); *A63B 21/00069* (2013.01); *A63B 21/023* (2013.01);
(Continued)

(58) Field of Classification Search
CPC ............ A63B 21/015; A63B 21/00069; A63B 21/023; A63B 21/15; A63B 21/4047;
(Continued)

(56) References Cited

U.S. PATENT DOCUMENTS

2010/0173753 A1* 7/2010 Wang ................. A63B 21/4034
482/52
2014/0336011 A1* 11/2014 Singh ................. A63B 22/0076
482/72

(Continued)

FOREIGN PATENT DOCUMENTS

| CN | 213852932 | * | 8/2021 |
| CN | 213852932 U | | 8/2021 |
| TW | M446645 U | | 2/2013 |

OTHER PUBLICATIONS

Search report for TW110117133, dated Oct. 27, 2021, Total of 1 page.

(Continued)

*Primary Examiner* — Andrew S Lo
*Assistant Examiner* — Andrew M Kobylarz
(74) *Attorney, Agent, or Firm* — Apex Juris, pllc; Lynette Wylie

(57) ABSTRACT

An exercise device with controllable training modes includes a base, a first exercise mechanism, a second exercise mechanism, and an operating mechanism. The first exercise mechanism has a first gear member. The second exercise mechanism has a second gear member. The operating mechanism has a third gear member. When the third gear member is at a first position, the third gear member meshes with the first gear member and the second gear member to form a linked state, so that the first exercise mechanism and the second exercise mechanism are operatively linked and coupled and swing in opposite directions. When the third gear member is at a second position, the third gear member is disengaged from either the first gear member or the second gear member or both to form a free state, so that the first exercise mechanism and the second exercise mechanism individually swing.

13 Claims, 15 Drawing Sheets

(51) Int. Cl.
*A63B 21/02* (2006.01)
*H02K 7/18* (2006.01)
*A63B 22/00* (2006.01)
*H02K 7/10* (2006.01)

(52) U.S. Cl.
CPC .......... *A63B 21/15* (2013.01); *A63B 21/4047* (2015.10); *A63B 22/001* (2013.01); *A63B 22/0005* (2015.10); *H02K 7/1004* (2013.01); *H02K 7/1853* (2013.01)

(58) Field of Classification Search
CPC .............. A63B 22/0005; A63B 22/001; A63B 22/0664; A63B 22/0015; A63B 2022/067; H02K 7/1004; H02K 7/1853
See application file for complete search history.

(56) References Cited

U.S. PATENT DOCUMENTS

| | | |
|---|---|---|
| 2017/0047870 A1* | 2/2017 | Lee .......................... H02K 1/06 |
| 2018/0269768 A1* | 9/2018 | Diehl ...................... H02K 49/04 |
| 2020/0197741 A1* | 6/2020 | Lee .................... A63B 24/0087 |
| 2021/0275866 A1* | 9/2021 | Rogus ................ A63B 22/0664 |
| 2023/0025399 A1* | 1/2023 | Rogus ................ A63B 24/0087 |

OTHER PUBLICATIONS

English abstract for CN213852932, Total of 1 page.
English abstract for TWM446645, Total of 1 page.

* cited by examiner

EXERCISE DEVICE WITH CONTROLLABLE TRAINING MODES

BACKGROUND OF THE INVENTION

Technical Field

The present invention relates generally to an exercise training device, and more particularly to an exercise device with controllable training modes.

Description of Related Art

Conventional exercise training equipment is mainly divided into a linked training type or an independent training type. In the linked training type, such as an elliptical trainer, the user can simultaneously train the left and right limbs and can train a coordination of the limbs. In the independent training type, the user can perform intensive training on the parts of the limbs with insufficient muscle strength.

However, the conventional exercise training equipment can only provide either the linked training mode or the independent training mode, so that the user cannot change the training modes on the same exercise training equipment, reducing the diversity of physical training.

BRIEF SUMMARY OF THE INVENTION

In view of the above, the primary objective of the present invention is to provide an exercise device with controllable training modes, which could allow a user to freely operate a linked training or an independent training depending on training needs, providing a variety of physical training, helping to enhance the effect of exercise or rehabilitation.

The present invention provides an exercise device with controllable training modes, including a base, a first exercise mechanism, a second exercise mechanism, and an operating mechanism, wherein the first exercise mechanism is disposed on a side of the base and has a first gear member. The second exercise mechanism is disposed on another side of the base opposite to the first exercise mechanism and has a second gear member. The operating mechanism is disposed between the first exercise mechanism and the second exercise mechanism and has a third gear member, wherein the third gear member is operable to be moved between a first position and a second position; when the third gear member is at the first position, the third gear member meshes with the first gear member and the second gear member to form a linked state, so that the first exercise mechanism and the second exercise mechanism are operatively linked and coupled and swing in opposite directions via the third gear member; when the third gear member is at the second position, the third gear member is disengaged from the first gear member, the second gear member, or both of the first gear member and the second gear member to form a free state, so that the first exercise mechanism and the second exercise mechanism individually swing With the aforementioned design, the user could freely control the operating mechanism depending on training requirement, wherein when the third gear member forms the free state, the third gear member is disengaged from either the first gear member or the second gear member or both, so that the first exercise mechanism and the second exercise mechanism could individually swing to individually train left half of the body or right half of the body, and a swing angle of the first exercise mechanism and a swing angle the second exercise mechanism are individually adjusted. When the third gear member forms the linked state, the third gear member meshes with the first gear member and the second gear member, so that the first exercise mechanism and the second exercise mechanism convert to the linked training. In this way, the exercise device with controllable training modes could be converted between the linked training and the independent training, providing a variety of physical training, helping to enhance the effect of exercise or rehabilitation.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
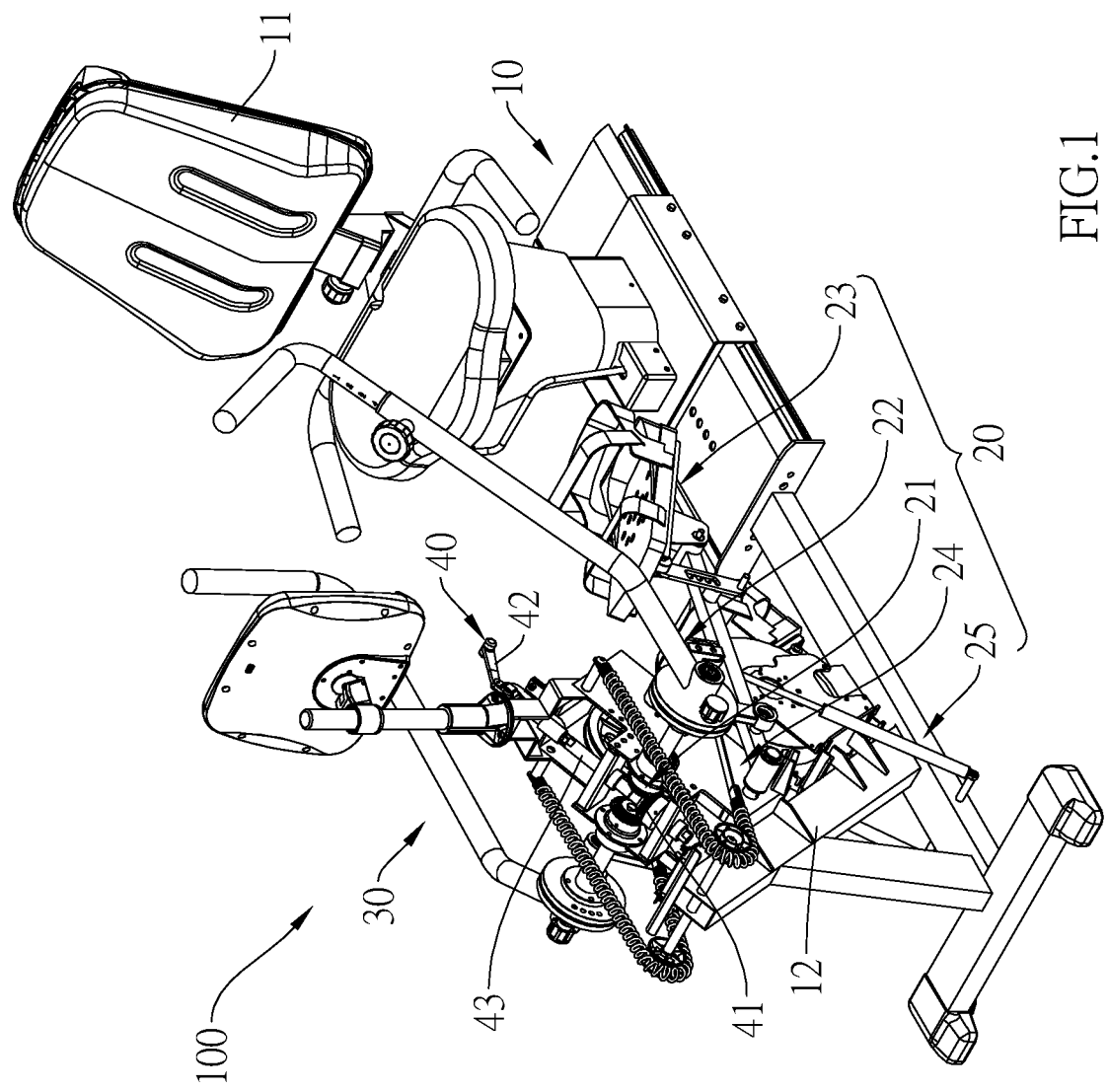
FIG. 1 is a perspective view of the exercise device with controllable training modes according to an embodiment of the present invention.

An exercise device 100 with controllable training modes according to an embodiment of the present invention is illustrated in FIG. 1 and includes a base 10, a first exercise mechanism 20, a second exercise mechanism 30, and an operating mechanism 40.

The base 10 includes an adjustable seat 11 and a support 12, wherein the adjustable seat 11 allows a user to adjust a front and rear position of the adjustable seat 11 depending on the required demand. The support 12 is disposed at a front end of the adjustable seat 11 (i.e., a direction that the user faces when sitting on the adjustable seat 11), and has a bottom frame 121 connected to the adjustable seat 11 and a supporting frame 122 uprightly arranged on the bottom frame 121.

Figure 2:
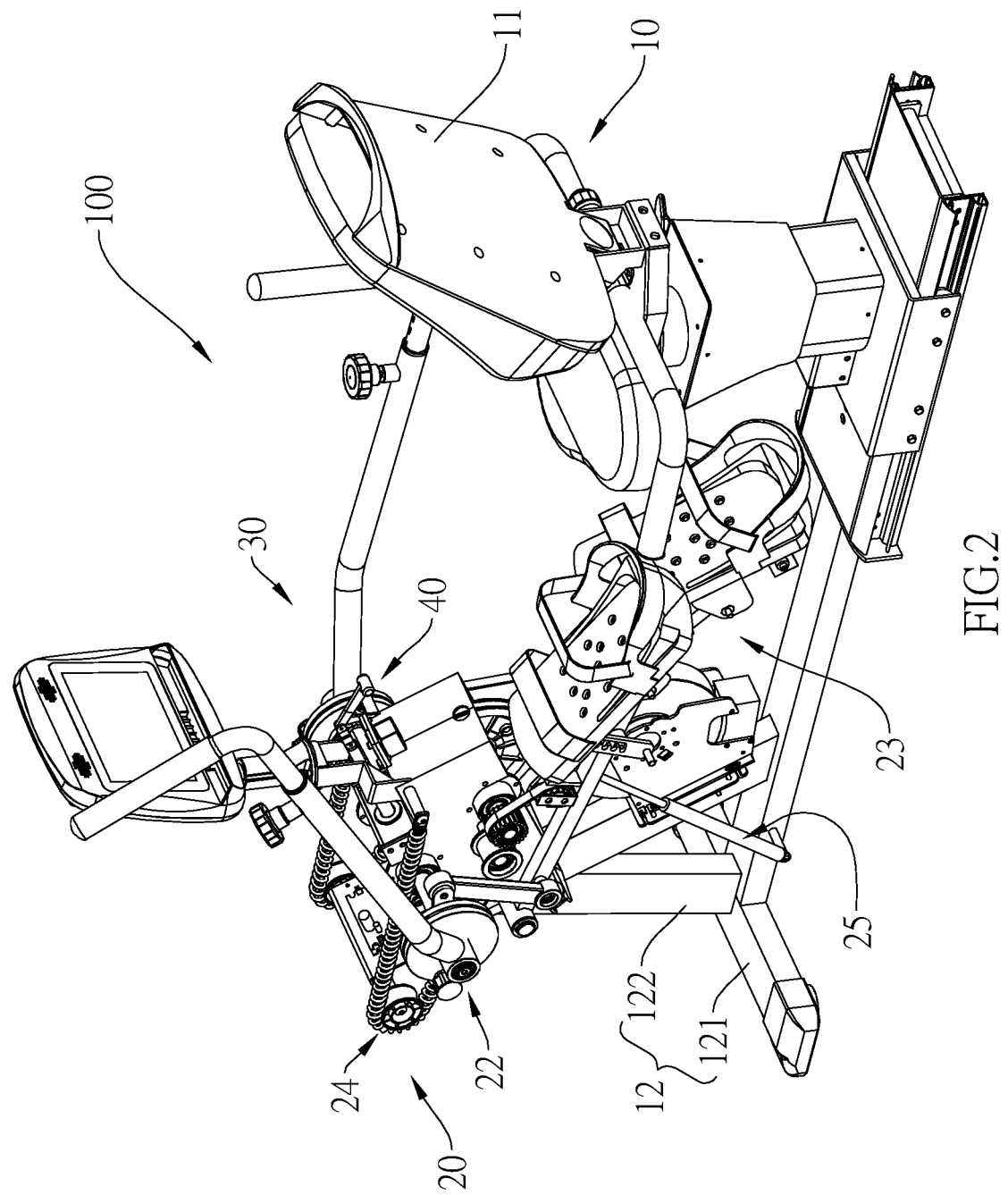
FIG. 2 is a perspective view of the exercise device according to the embodiment of the present invention seen from another direction.
Figure 3:
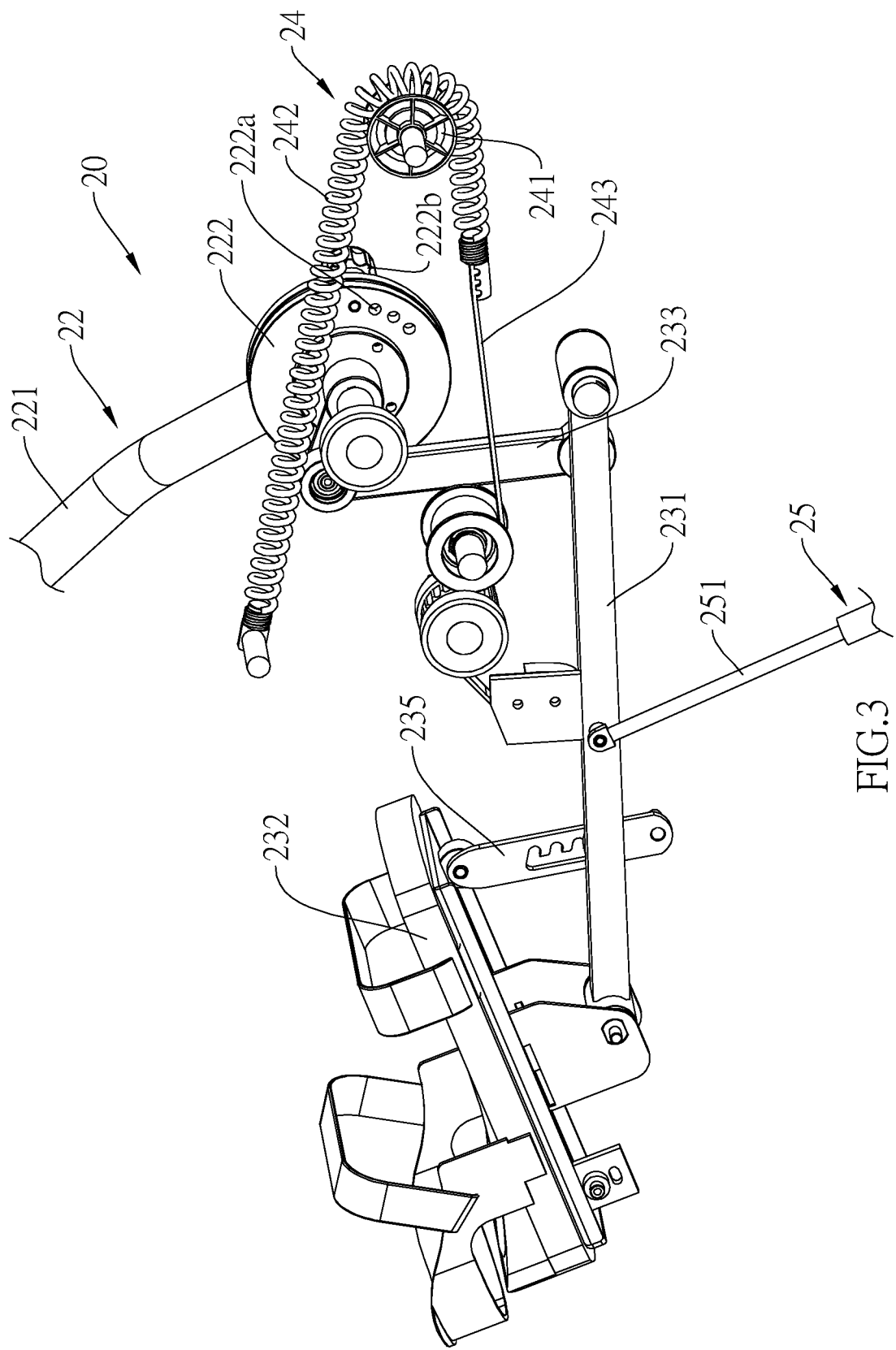
FIG. 3 is a schematic view, showing the first exercise mechanism of the exercise device according to the embodiment of the present invention.

The first exercise mechanism 20 is disposed on a side of the base 10, wherein the first exercise mechanism 20 is disposed on a left side of the base 10 from the perspective of FIG. 2, for allowing the user to train his/her left body limb. Referring to FIG. 1 to FIG. 3, the first exercise mechanism 20 includes a first gear member 21, a first upper limb unit 22, and a first lower limb unit 23, wherein the first upper limb unit 22 is connected to the first gear member 21 for providing the user with arm swing training. The first upper limb unit 22 has a first swing arm 221 and a first rotating portion 222 disposed at an end of the first swing arm 221, wherein the first rotating portion 222 is connected to the first gear member 21 via a rotating shaft. The first lower limb unit 23 is connected to the first upper limb unit 22 for providing the user with leg training and is operatively linked and coupled to the first upper limb unit 22. The first lower limb unit 23 includes a first connecting rod 231, a first pedal 232, a first pivoting rod 233, and a first block 234, wherein a two ends of the first connecting rod 231 are respectively connected to the supporting frame 122 of the base 10 and the first pedal 232. An end of the first pivoting rod 233 is pivotally connected to the first connecting rod 231, and another end thereof is disposed on the first rotating portion 222 and is eccentric to the rotating shaft of the first rotating portion 222. The first block 234 is disposed on the base 10 for being abutted by the first connecting rod 231. In other embodiments, the first exercise mechanism 20 could provide either the first upper limb unit 22 or the first lower limb unit 23 for the user to train the body.

Referring to FIG. 3, a plurality of first adjusting holes 222a and a first pin 222b are disposed on the first rotating portion 222, wherein the first pin 222b could be selectively inserted into one of the first adjusting holes 222a for adjusting a predetermined angle of the first swing arm 221. The first lower limb unit 23 includes a first pedal adjusting portion 235 disposed between the first pedal 232 and the first connecting rod 231 for adjusting a predetermined angle of the first pedal 232. In other embodiments, the first adjusting holes 222a and the first pin 222b of the first rotating portion 222 and the first pedal adjusting portion 235 could be omitted.

Figure 9:
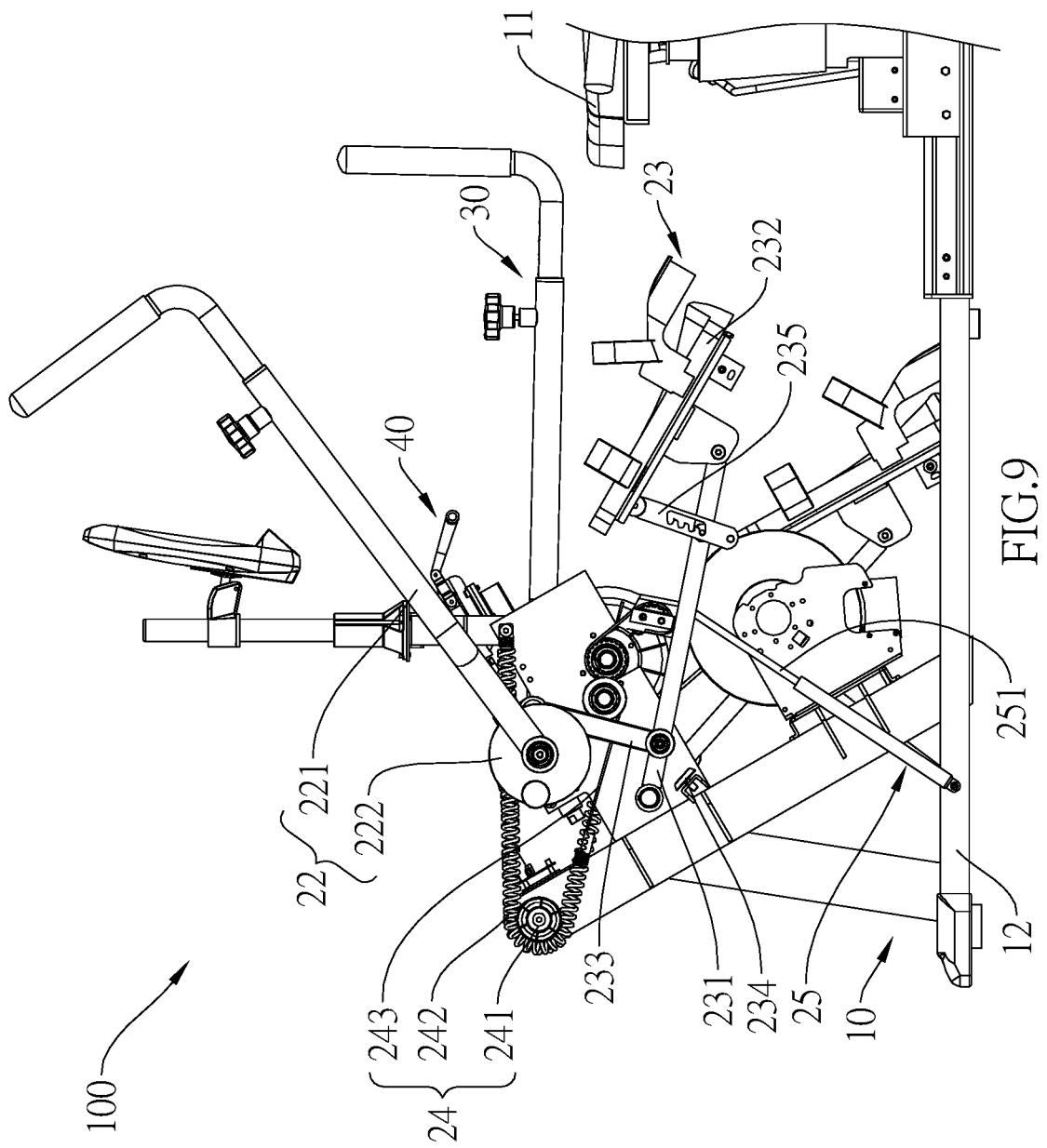
FIG. 9 is a right side view of the exercise device according to the embodiment of the present invention.

Referring to FIG. 3 and FIG. 9, when a user operates the first swing arm 221 to swing, the first swing arm 221 drives the first rotating portion 222 to rotate, at this time, the first pivoting rod 233 is driven by the first rotating portion 222 to drive the first connecting rod 231 and the first pedal 232 to swing, so that the first upper limb unit 22 and the first lower limb unit 23 are operatively linked and coupled for providing the user with both of left upper limb and left lower limb training.

Referring to FIG. 1 and FIG. 3, the first exercise mechanism 20 further includes a first elastic unit 24 and a first damper 25 for providing the first lower limb unit 23 with resistance training. The first elastic unit 24 is connected between the base 10 and the first lower limb unit 23 and includes a first roller 241, a first spring 242, and a first belt 243, wherein the first roller 241 is rotatably disposed on the supporting frame 122 of the base 10, and a part of the first spring 242 surrounds the first roller 241, and an end of the first spring 242 is fixed to the base 10, and the first belt 243 is fixed to the first connecting rod 231 and is connected to another end of the first spring 242. The first damper 25 is disposed on the bottom frame 121 of the base 10 and is connected to the first connecting rod 231 via a first pressure shaft 251. In other embodiments, the first elastic unit 24 and the first damper 25 could be omitted.

Figure 4:
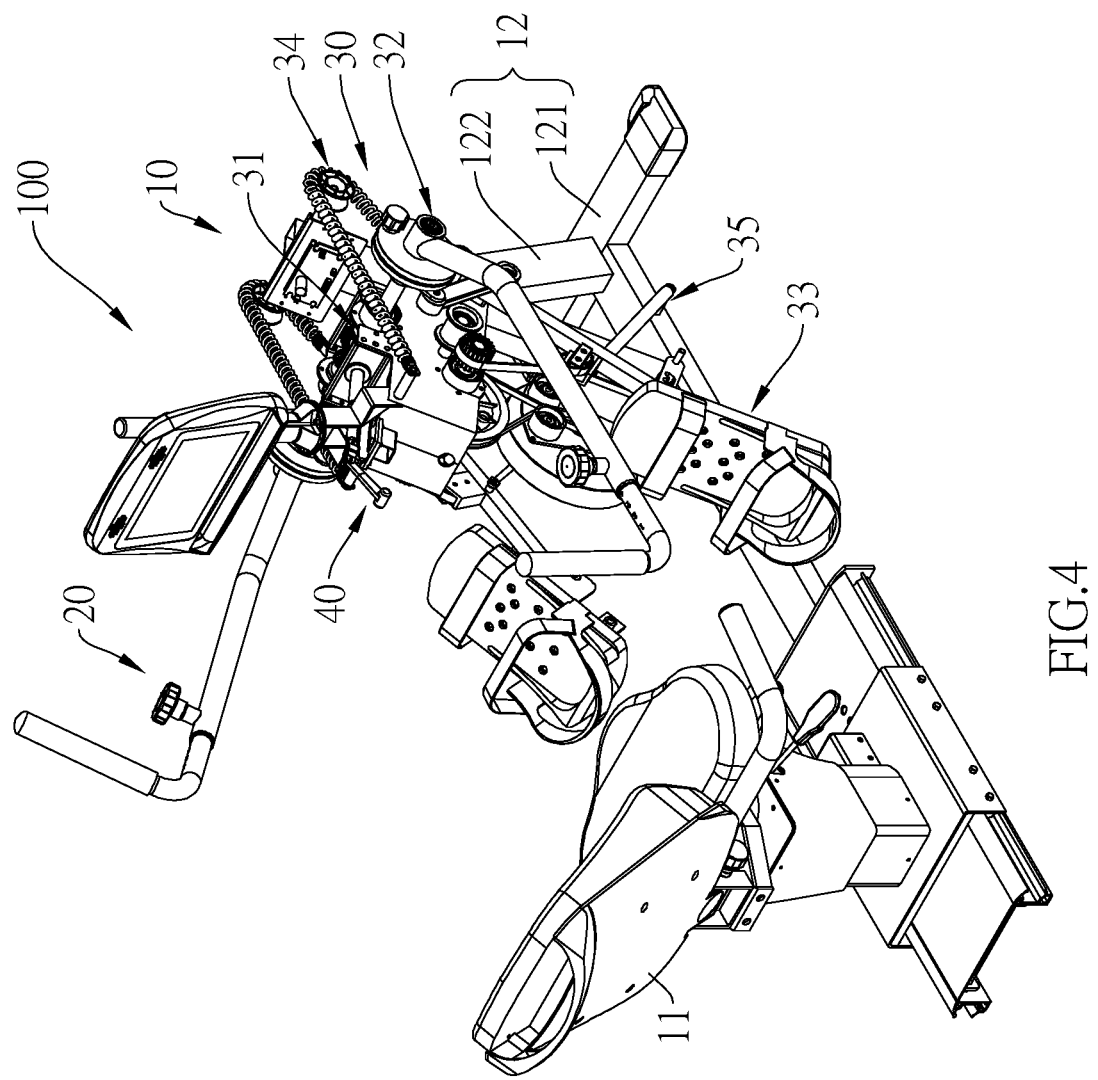
FIG. 4 is a perspective view of the exercise device according to the embodiment of the present invention seen from still another direction.
Figure 5:
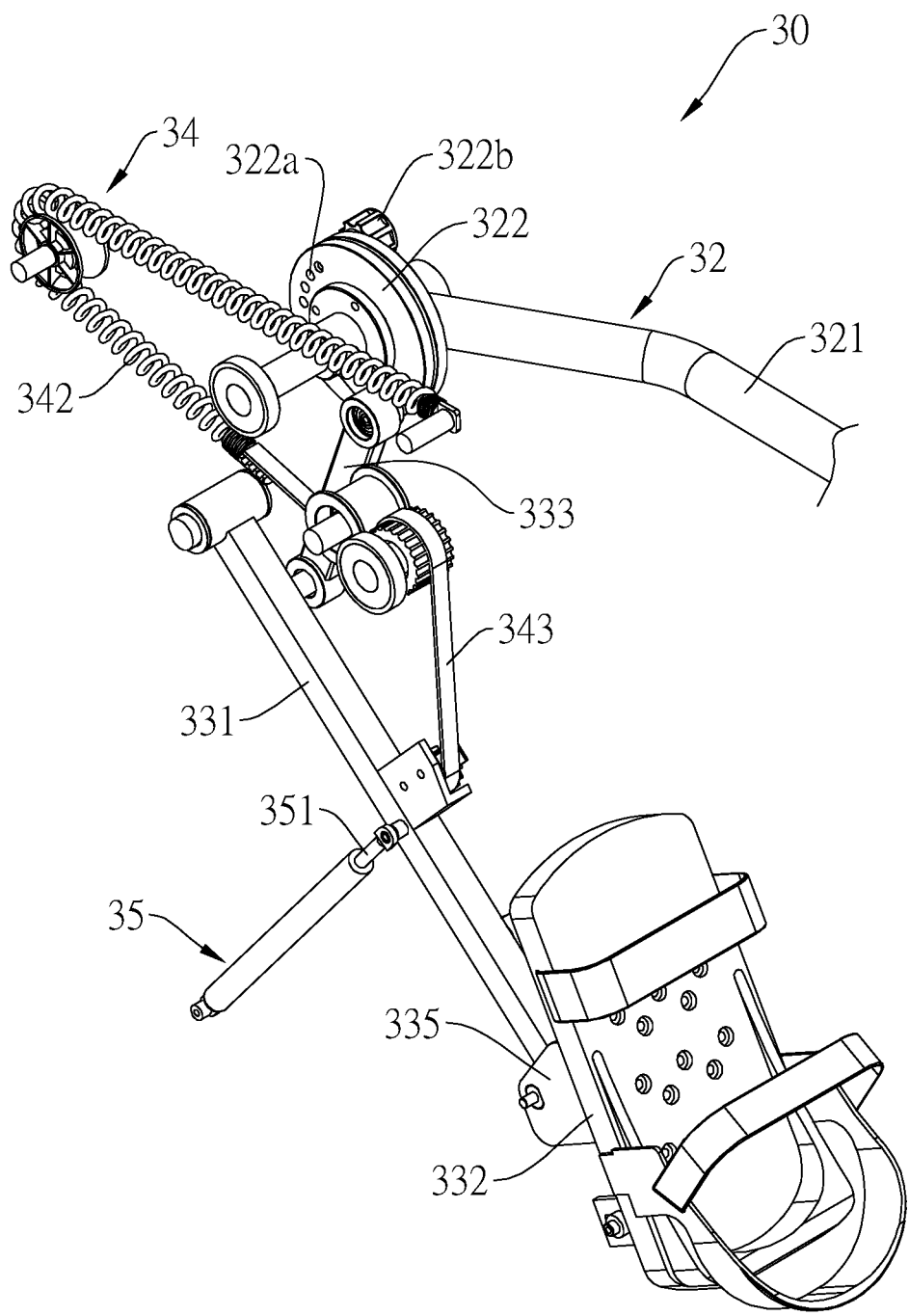
FIG. 5 is a schematic view, showing the second exercise mechanism of the exercise device according to the embodiment of the present invention.
Figure 6:
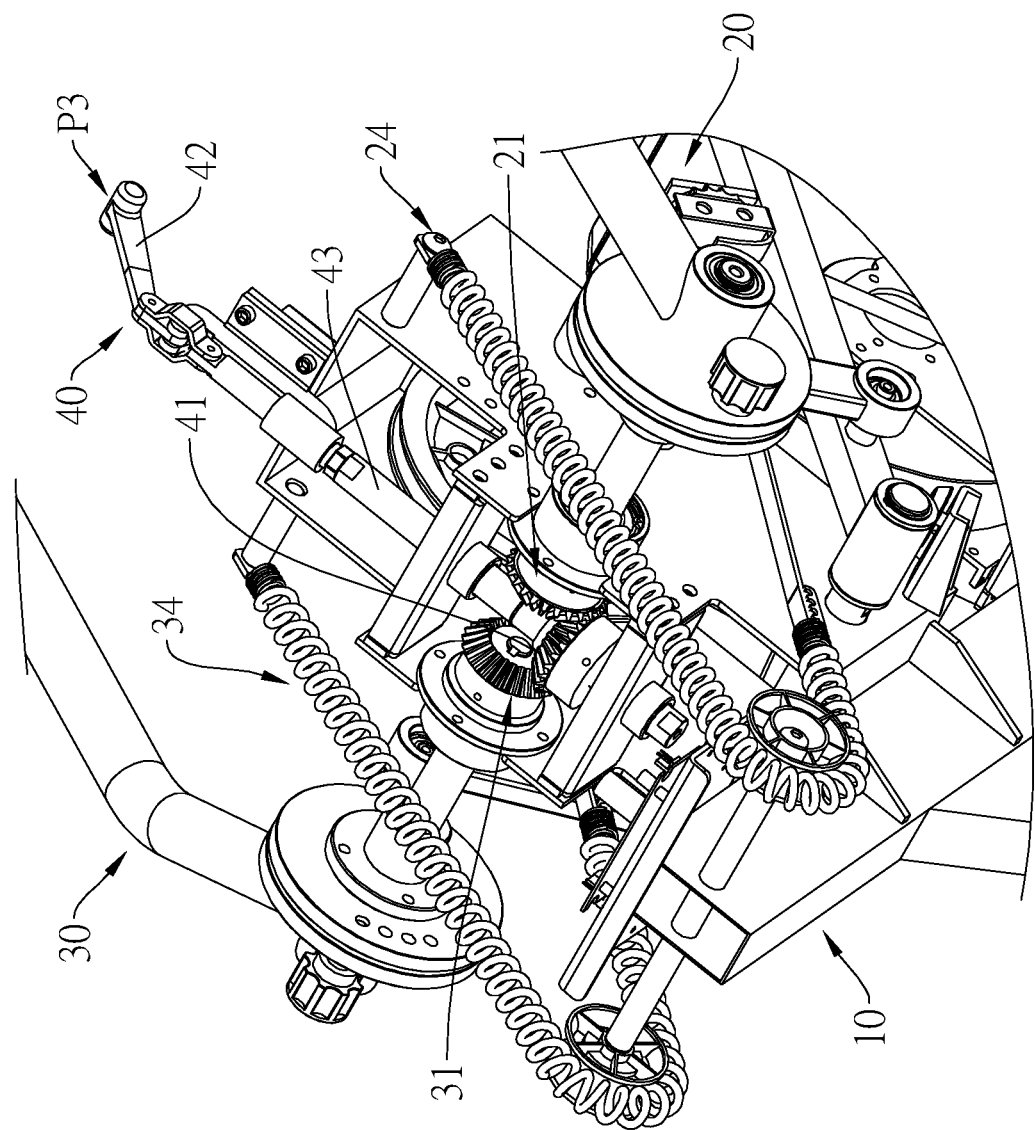
FIG. 6 is a schematic view, showing the first exercise mechanism, the second exercise mechanism, and the operating mechanism.
Figure 7:
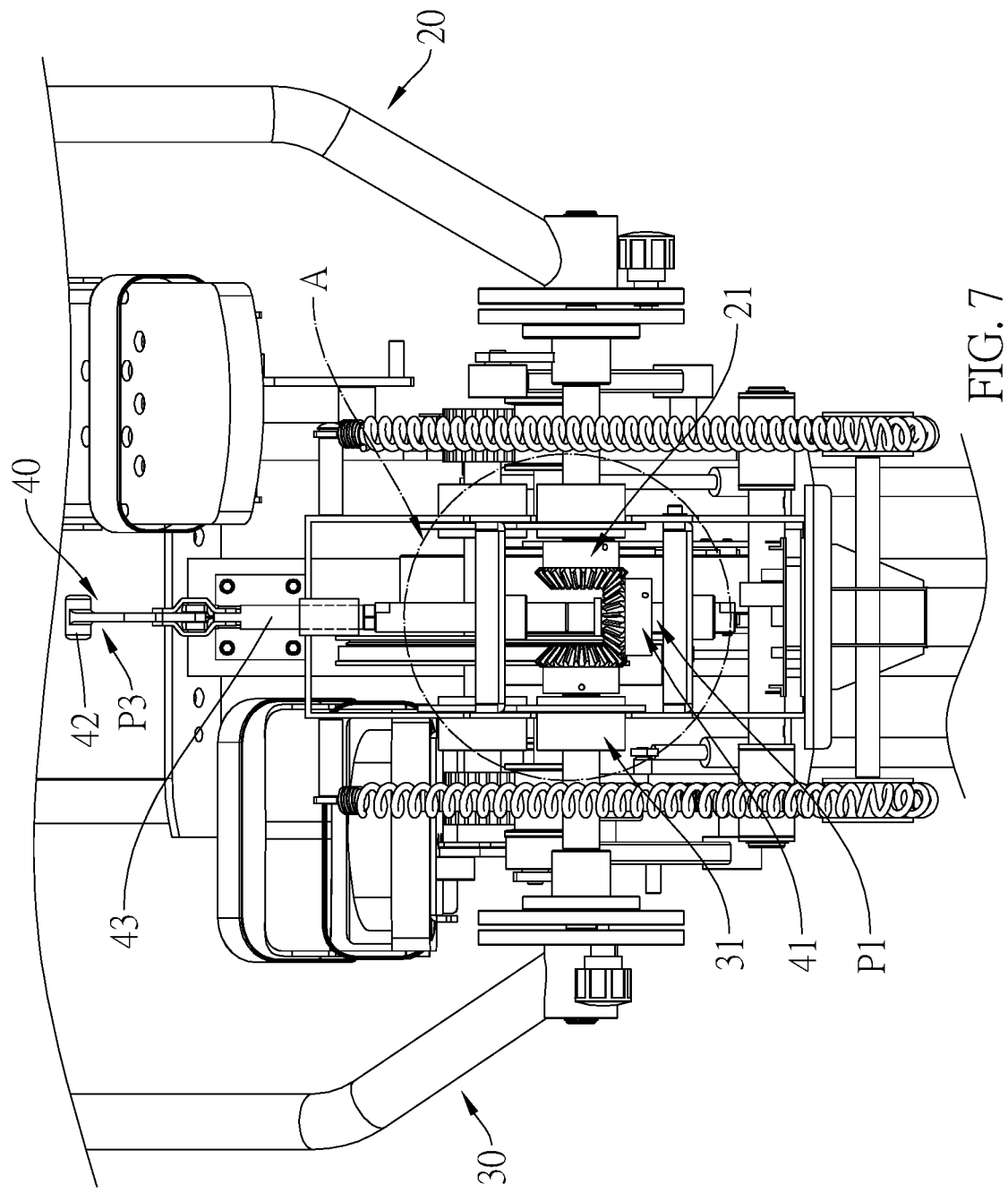
FIG. 7 is a top view of FIG. 6.

Referring to FIG. 4 to FIG. 6, the second exercise mechanism 30 is disposed on another side of the base 10 to be opposite to the first exercise mechanism 20. In the current embodiment, the second exercise mechanism 30 is disposed on a right side of the base 10 from the perspective of FIG. 4 for allowing the user to train his/her right body limb. The second exercise mechanism 30 and the first exercise mechanism 20 have the same structures. More specifically, the second exercise mechanism 30 includes a second gear member 31, a second upper limb unit 32, and a second lower limb unit 33, wherein the second upper limb unit 32 is connected to the second gear member 31, and the second upper limb unit 32 includes a second swing arm 321 and a second rotating portion 322 disposed at an end of the second swing arm 321, and the second rotating portion 322 is connected to the second gear member 31 via a rotating shaft. The second lower limb unit 33 is connected to the second upper limb unit 32 and includes a second connecting rod 331, a second pedal 332, a second pivoting rod 333, and a second block 334, wherein two ends of the second connecting rod 331 are respectively connected to the supporting frame 122 of the base 10 and the second pedal 332. An end of the second pivoting rod 333 is connected to the second connecting rod 331, and another end thereof is disposed on the second rotating portion 322 and is eccentric to the rotating shaft of the second rotating portion 322. The second block 334 is disposed on the base 10 for being abutted by the second connecting rod 331. In other embodiments, the second exercise mechanism 30 could provide either the second upper limb unit 32 or the second lower limb unit 33 for the user to train the body.

Referring to FIG. 5, a plurality of second adjusting holes 322a and a second pin 322b are disposed on the second rotating portion 322, wherein the second pin 322b could be selectively inserted into one of the second adjusting holes 322a for adjusting a predetermined angle of the second swing arm 321. The second lower limb unit 33 includes a second pedal adjusting portion 335 disposed between the second pedal 332 and the second connecting rod 331 for adjusting a predetermined angle of the second pedal 332. In other embodiments, the second adjusting holes 322a and the second pin 322b of the second rotating portion 322 and the second pedal adjusting portion 335 could be omitted.

Figure 10:
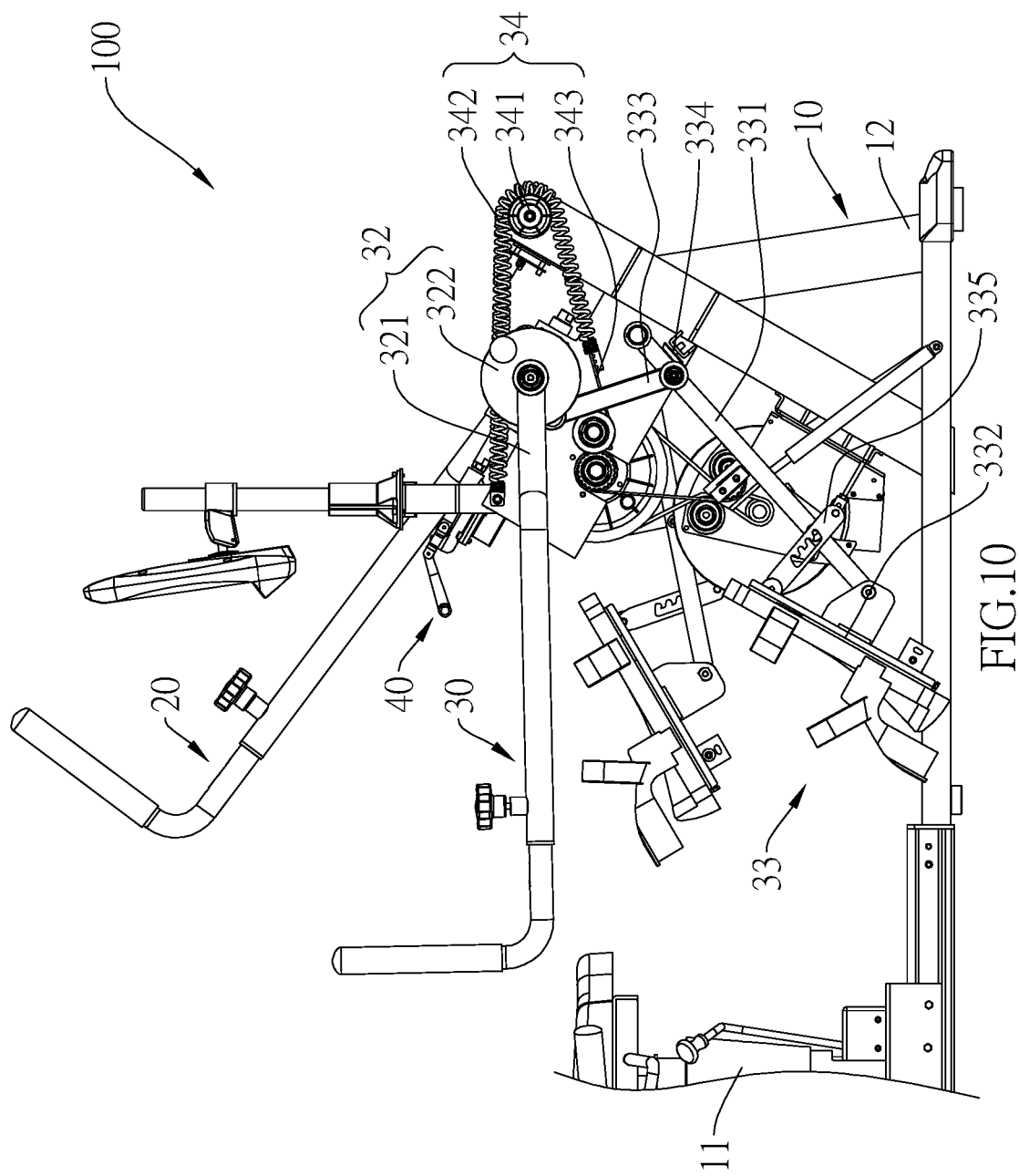
FIG. 10 is a left side view of the exercise device according to the embodiment of the present invention.

Referring to FIG. 4 and FIG. 10, when a user operates the second swing arm 321 to swing, the second swing arm 321 drives the second rotating portion 322 to rotate, at this time, the second pivoting rod 333 is driven by the second rotating portion 322 to drive the second connecting rod 331 and the second pedal 332 to swing, so that the second upper limb unit 32 and the second lower limb unit 33 are operatively linked and coupled for providing the user with both of right upper limb and right lower limb training.

Referring to FIG. 4, FIG. 5, and FIG. 10, the second exercise mechanism 30 further includes a second elastic unit 34 and a second damper 35 for providing the second lower limb unit 33 with resistance training. The second elastic unit 34 is connected between the base 10 and the second lower limb unit 33 and includes a second roller 341, a second spring 342, and a second belt 343, wherein the second roller 341 is rotatably disposed on the supporting frame 122 of the base 10, and a part of the second spring 342 surrounds the second roller 341, and an end of the second spring 342 is fixed to the base 10, and the second belt 343 is fixed to the second connecting rod 331 and is connected to another end of the second spring 342. The second damper 35 is disposed on the bottom frame 121 of the base 10 and is connected to the second connecting rod 331 via a second pressure shaft 351.

Referring to FIG. 1, FIG. 6, FIG. 7, and FIG. 12, the operating mechanism 40 is disposed between the first exercise mechanism 20 and the second exercise mechanism 30, and has a third gear member 41. In the current embodiment, the first gear member 21, the second gear member 31, and the third gear member 41 are respectively, but not limited to, a bevel gear. The third gear member 41 is operable to move between a first position P1 and a second position P2, wherein when the third gear member 41 is at the first position P1, the third gear member 41 meshes with both of the first gear member 21 and the second gear member 31 to form a linked state (i.e., linked mode), so that the first exercise mechanism 20 and the second exercise mechanism 30 are operatively linked and coupled and swing in opposite directions; when the third gear member 41 is at the second position P2, the third gear member 41 is disengaged from the first gear member 21, the second gear member 22, or both of the first gear member 21 and the second gear member 22 to form a free state (i.e., free mode), so that the first exercise mechanism 20 and the second exercise mechanism 30 could individually swing.

Figure 8:
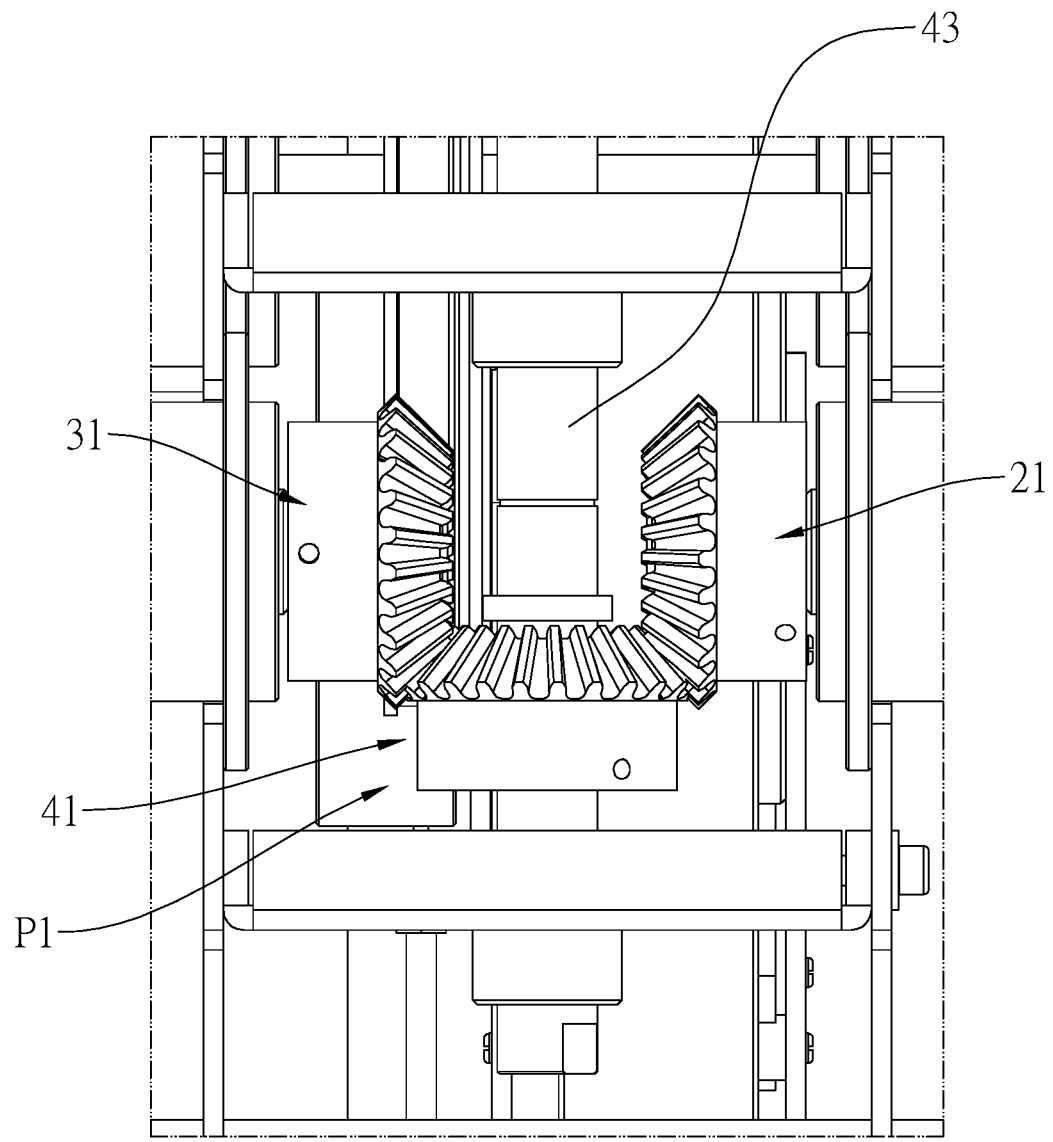
FIG. 8 is an enlarged partial view of a marked region A in FIG. 7, showing the third gear member forms the linked state.
Figure 11:
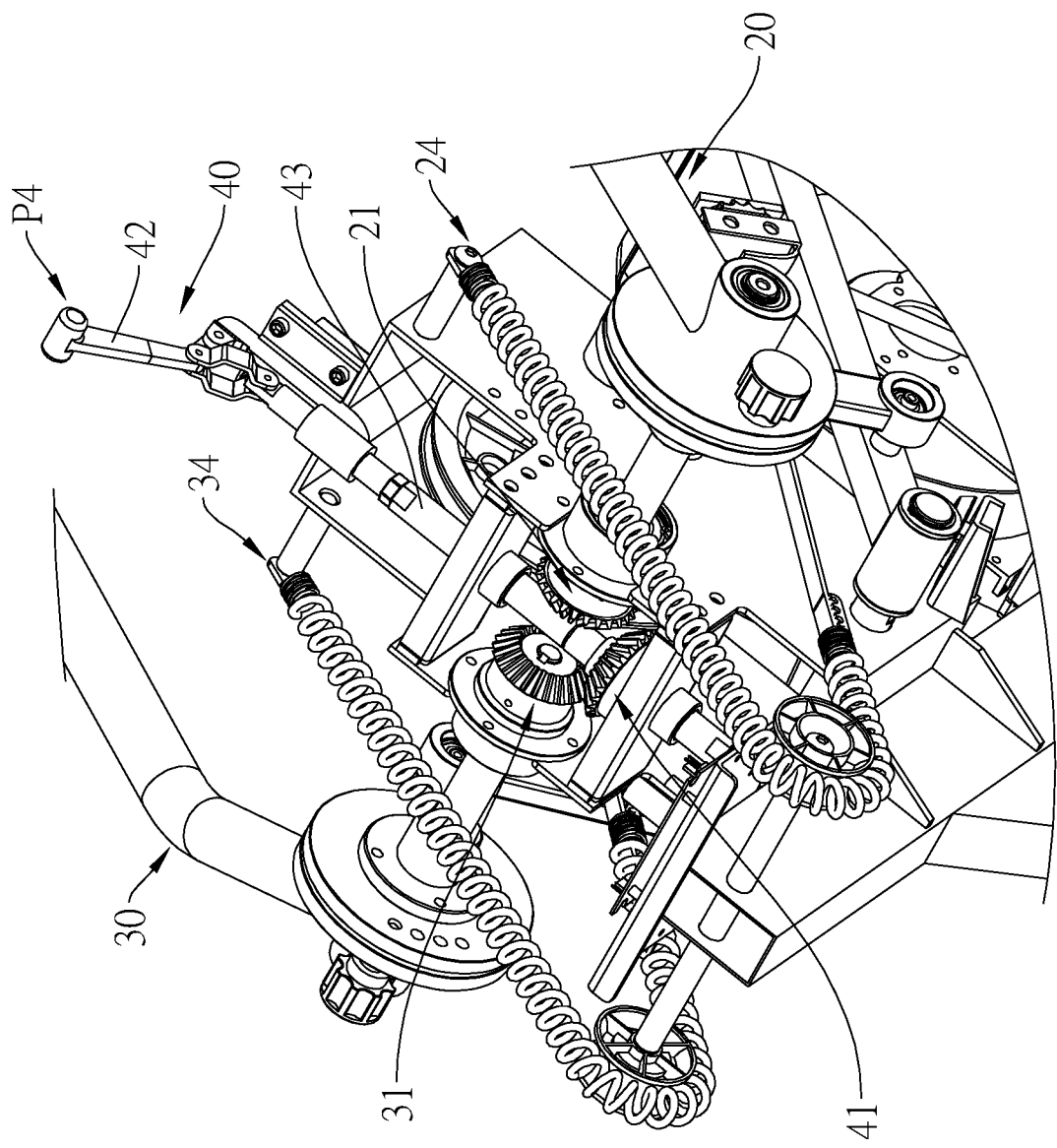
FIG. 11 is a schematic view, showing the first exercise mechanism, the second exercise mechanism, and the operating mechanism at another mode.
Figure 12:
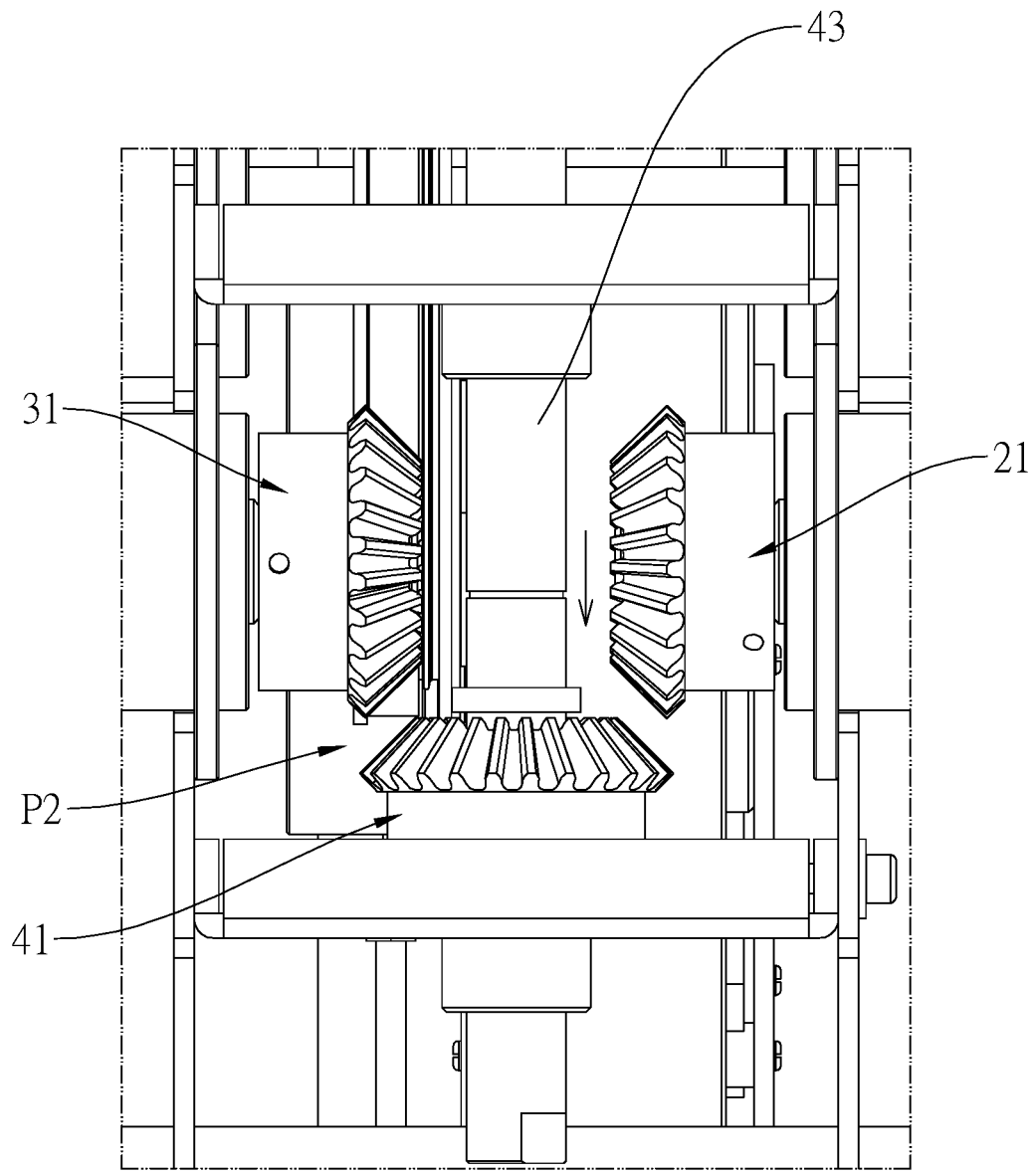
FIG. 12 is similar to FIG. 8, showing the third gear member forms the free state.

Referring to FIGS. 6-8 and FIGS. 11-12, the operating mechanism 40 includes a pivoting shaft 42 and a connecting shaft 43, wherein the pivoting shaft 42 could swing between a lower position P3 (as shown in FIG. 6) and an upper position P4 (as shown in FIG. 11). When the pivoting shaft 42 is located at the lower position P3, the third gear member 41 is moved to the first position P1 (as shown in FIG. 8), while when the pivoting shaft 42 is located at the upper position P4, the third gear member 41 is moved to the second position P2 (as shown in FIG. 12). More specifically, referring to FIG. 6 to FIG. 8, the connecting shaft 43 is connected between the pivoting shaft 42 and the third gear member 41, wherein when the pivoting shaft 42 is moved to the lower position P3, the connecting shaft 43 is driven by the pivoting shaft 42 to drive the third gear member 41 to move upward, so that the third gear member 41 meshes with the first gear member 21 and the second gear member 42 to form the linked state; referring to FIG. 11 and FIG. 12, when the pivoting shaft 42 is moved to the upper position P4, the connecting shaft 43 is driven by the pivoting shaft 42 to drive the third gear member 41 to move downward, so that the third gear member 41 is disengaged from the first gear member 21 and the second gear member 31 to form the free state. In the current embodiment, a moving direction of the connecting shaft 43 is, but not limited to, perpendicular to both a rotating shaft of the first gear member 21 and a rotating shaft of the second gear member 31. In this way, the user could freely operate the operating mechanism 40 depending on training needs, so that the first exercise mechanism 20 and the second exercise mechanism 30 could be converted between the linked training and the independent training, providing a variety of physical training.

Figure 13:
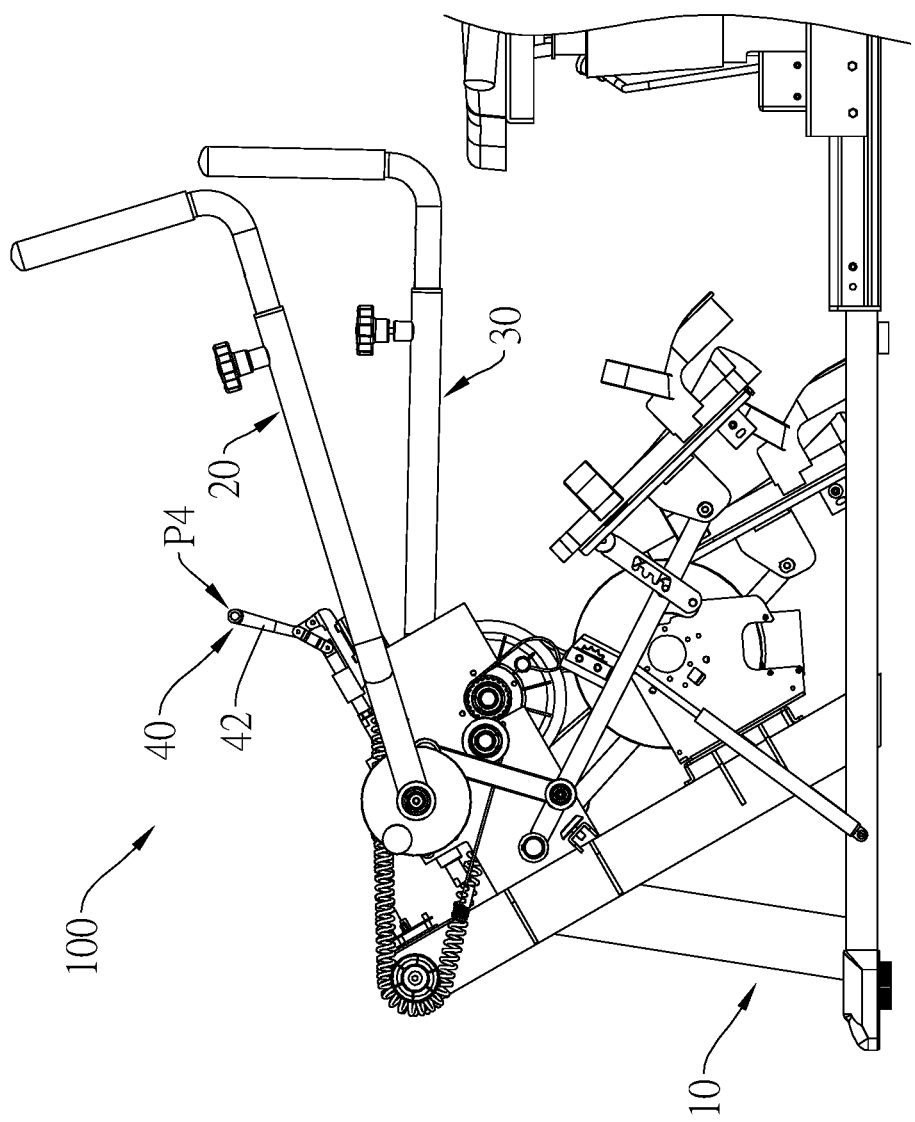
FIG. 13 is a side view of the exercise device according to the embodiment of the present invention at the another mode.
Figure 14:
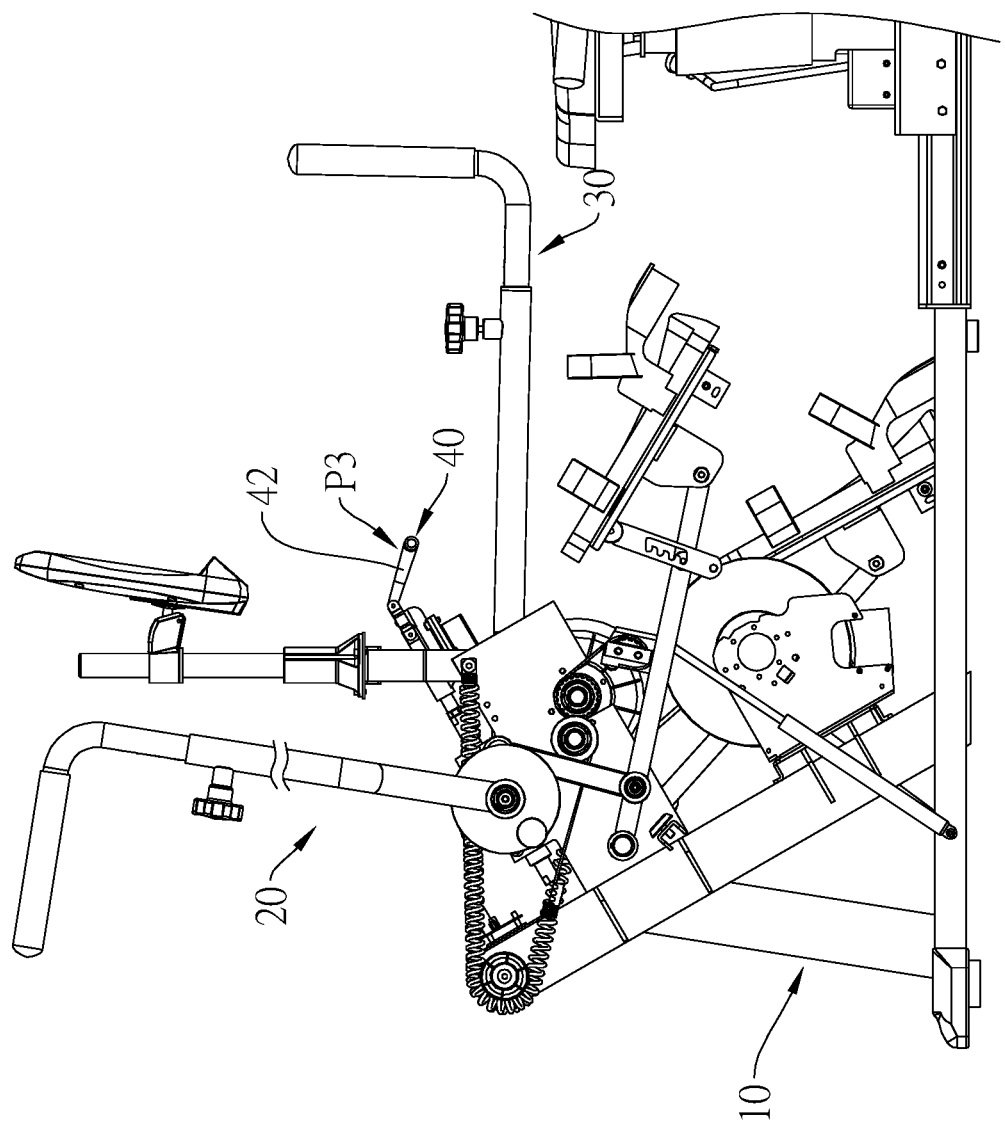
FIG. 14 is a side view of the exercise device according to the embodiment of the present invention.

Referring to FIG. 13 and FIG. 14, when the pivoting shaft 42 is located at the upper position P4 (as shown in FIG. 13), the third gear member 41 forms the free state, so that the first exercise mechanism 20 and the second exercise mechanism 30 could individually swing, and a swing angle of the first exercise mechanism 20 and a swing angle the second exercise mechanism 30 could be individually adjusted, whereby the user could individually train left half of the body or right half of the body. When the pivoting shaft 42 is moved back to the lower position P3 (as shown in FIG. 14) from the upper position P4, the third gear member 41 meshes with the first gear member 21 and the second gear member 31 again, and the third gear member 41 forms the linked state, so that the first exercise mechanism 20 and the second exercise mechanism 30 convert to the linked training.

Figure 15:
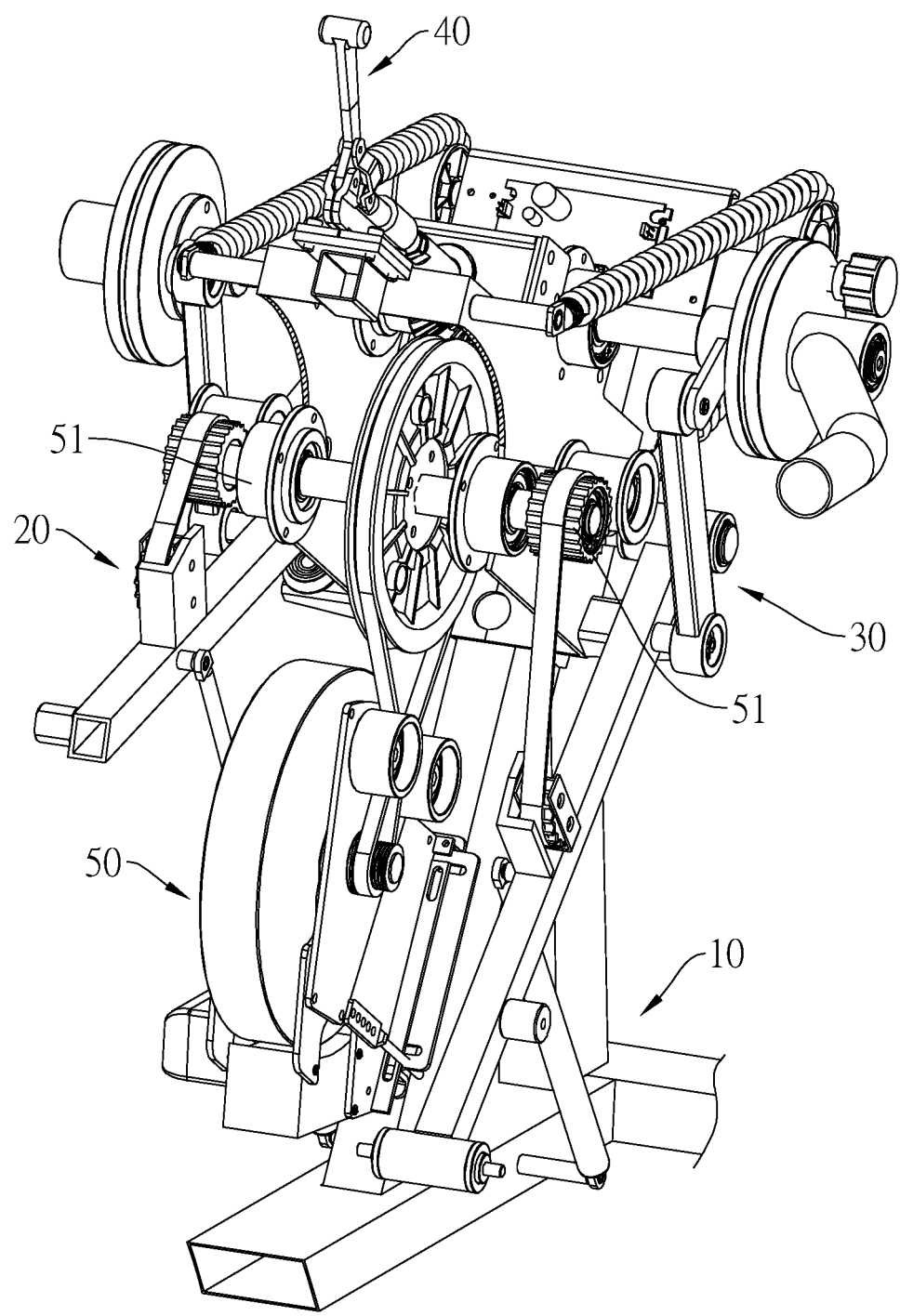
FIG. 15 is a schematic partial view, showing the power generation mechanism is disposed on the exercise device according to the embodiment of the present invention.

Referring to FIG. 15, the exercise device 100 further includes a power generation mechanism 50 disposed between the first exercise mechanism 20 and the second exercise mechanism 30. In the current embodiment, a side of the power generation mechanism 50 is connected to the first exercise mechanism 20 via one of two pulley assemblies 51, and another side of the power generation mechanism 50 is connected to the second exercise mechanism 30 via the other one of the two pulley assemblies 51, wherein when the first exercise mechanism 20, the second exercise mechanism 30, or both of the first exercise mechanism 20 and the second exercise mechanism 30 swing, the power generation mechanism 50 generates an electric energy for supplying power required for a display screen (not shown). However, in other embodiments, the power generation mechanism 50 could be omitted.

With the aforementioned design, the user could freely control the operating mechanism 40 depending on training requirement, wherein when the pivoting shaft 42 is located at the upper position P4, the third gear member 41 forms the free state, so that the third gear member 41 is disengaged from the first gear member 21, the second gear member 31, or both of the first gear member 21 and the second gear member 31, allowing the first exercise mechanism 20 and the second exercise mechanism 30 to individually swing, and a swing angle of the first exercise mechanism 20 and a swing angle the second exercise mechanism 30 could be individually adjusted, thereby the user could individually train left half of the body or right half of the body; when the pivoting shaft 42 is moved back to the lower position P3, the third gear member 41 meshes with the first gear member 21 and the second gear member 31 again, and the third gear member 41 forms the linked state, so that the first exercise mechanism 20 and the second exercise mechanism 30 could provide the linked training. In this way, the exercise device 100 with controllable training modes could be converted between the linked training and the independent training, providing a variety of physical training, helping to enhance the effect of exercise or rehabilitation.

It must be pointed out that the embodiments described above are only some preferred embodiments of the present invention. All equivalent structures which employ the concepts disclosed in this specification and the appended claims should fall within the scope of the present invention.

What is claimed is:

1. An exercise device with controllable training modes, comprising:
    a base;
    a first exercise mechanism disposed on a side of the base and having a first gear member;
    a second exercise mechanism disposed on another side of the base opposite to the first exercise mechanism and having a second gear member; and
    an operating mechanism disposed between the first exercise mechanism and the second exercise mechanism and having a third gear member, wherein the third gear member is operable to be moved between a first position and a second position; when the third gear member is at the first position, the third gear member meshes with the first gear member and the second gear member to form a linked state, so that the first exercise mechanism and the second exercise mechanism are operatively linked and coupled and swing in opposite directions via the third gear member; when the third gear member is at the second position, the third gear member is disengaged from the first gear member, the second gear member, or both of the first gear member and the second gear member to form a free state, so that the first exercise mechanism and the second exercise mechanism individually swing;

wherein the operating mechanism comprises a pivoting shaft which is swingable between a lower position and an upper position; the pivoting shaft located at the lower position drives the third gear member to move to the first position; the pivoting shaft located at the upper position drives the third gear member to move to the second position;

wherein the operating mechanism comprises a connecting shaft connected between the pivoting shaft and the third gear member; when the pivoting shaft is moved to the lower position, the connecting shaft is driven by the pivoting shaft to drive the third gear member to move upward, so that the third gear member meshes with the first gear member and the second gear member to form the linked state; when the pivoting shaft is moved to the upper position, the connecting shaft is driven by the pivoting shaft to drive the third gear member to move downward, so that the third gear member is disengaged from the first gear member and the second gear member to form the free state.

2. The exercise device as claimed in claim 1, wherein when the pivoting shaft is located at the upper position the third gear member forms the free state, so that the first exercise mechanism and the second exercise mechanism individually swing, and a swing angle of the first exercise mechanism and a swing angle the second exercise mechanism are individually adjusted; when the pivoting shaft is moved back to the lower position from the upper position, the third gear member meshes with the first gear member and the second gear member again, and the third gear member forms the linked state.

3. The exercise device as claimed in claim 1, wherein when the pivoting shaft is located at the upper position the third gear member forms the free state, so that the first exercise mechanism and the second exercise mechanism individually swing, and a swing angle of the first exercise mechanism and a swing angle the second exercise mechanism are individually adjusted; when the pivoting shaft is moved back to the lower position from the upper position, the third gear member meshes with the first gear member and the second gear member again, and the third gear member forms the linked state.

4. The exercise device as claimed in claim 1, wherein a moving direction of the connecting shaft is perpendicular to a rotating shaft of the first gear member and a rotating shaft of the second gear member.

5. The exercise device as claimed in claim 1, wherein the first gear member faces the second gear member, and the third gear member is disposed between the first gear member and the second gear member.

6. An exercise device with controllable training modes, comprising:
a base;
a first exercise mechanism disposed on a side of the base and having a first gear member;
a second exercise mechanism disposed on another side of the base opposite to the first exercise mechanism and having a second gear member; and
an operating mechanism disposed between the first exercise mechanism and the second exercise mechanism and having a third gear member, wherein the third gear member is operable to be moved between a first position and a second position; when the third gear member is at the first position, the third gear member meshes with the first gear member and the second gear member to form a linked state, so that the first exercise mechanism and the second exercise mechanism are operatively linked and coupled and swing in opposite directions via the third gear member; when the third gear member is at the second position, the third gear member is disengaged from the first gear member, the second gear member, or both of the first gear member and the second gear member to form a free state, so that the first exercise mechanism and the second exercise mechanism individually swing;
wherein the first gear member is a bevel gear, and the second gear member is a bevel gear, and the third gear member is a bevel gear.

7. The exercise device as claimed in claim 5, wherein the first gear member is a bevel gear, and the second gear member is a bevel gear, and the third gear member is a bevel gear.

8. An exercise device with controllable training modes, comprising:
a base;
a first exercise mechanism disposed on a side of the base and having a first gear member;
a second exercise mechanism disposed on another side of the base opposite to the first exercise mechanism and having a second gear member; and
an operating mechanism disposed between the first exercise mechanism and the second exercise mechanism and having a third gear member, wherein the third gear member is operable to be moved between a first position and a second position; when the third gear member is at the first position, the third gear member meshes with the first gear member and the second gear member to form a linked state, so that the first exercise mechanism and the second exercise mechanism are operatively linked and coupled and swing in opposite directions via the third gear member; when the third gear member is at the second position, the third gear member is disengaged from the first gear member, the second gear member, or both of the first gear member and the second gear member to form a free state, so that the first exercise mechanism and the second exercise mechanism individually swing;
wherein the first exercise mechanism comprises a first upper limb unit connected to the first gear member; the first upper limb unit has a first swing arm and a first rotating portion disposed at an end of the first swing arm; the first rotating portion is connected to the first gear member via a rotating shaft of the first rotating portion; the second exercise mechanism comprises a second upper limb unit connected to the second gear member; the second upper limb unit comprises a second swing arm and a second rotating portion disposed at an end of the second swing arm; the second rotating portion is connected to the second gear member via a rotating shaft of the second rotating portion.

9. The exercise device as claimed in claim 8, wherein the first exercise mechanism comprises a first lower limb unit connected to the first upper limb unit; the first lower limb unit comprises a first connecting rod, a first pedal, and a first pivoting rod; two ends of the first connecting rod are respectively connected to the base and the first pedal; an end of the first pivoting rod is connected to the first connecting rod, and another end of the first pivoting rod is disposed on the first rotating portion and is eccentric to the rotating shaft of the first rotating portion; the second exercise mechanism comprises a second lower limb unit connected to the second upper limb unit; the second lower limb unit comprises a second connecting rod, a second pedal, and a second pivoting rod; two ends of the second connecting rod are respectively connected to the base and the second pedal; an end of the second pivoting rod is connected to the second connecting rod, and another end of the second pivoting rod is disposed on the second rotating portion and is eccentric to the rotating shaft of the second rotating portion.

10. The exercise device as claimed in claim 9, wherein the first exercise mechanism further comprises a first elastic unit connected between the base and the first lower limb unit; the first elastic unit comprises a first roller, a first spring, and a first belt; the first roller is rotatably disposed on the base; an end of the first spring is fixed to the base, and a part of the first spring surrounds the first roller; the first belt is fixed to the first connecting rod and is connected to another end of the first spring; the second exercise mechanism further comprises a second elastic unit connected between the base and the second lower limb unit; the second elastic unit comprises a second roller, a second spring, and a second belt; the second roller is rotatably disposed on the base; a part of the second spring surrounds the second roller, and an end of the second spring is fixed to the base; the second belt is fixed to the second connecting rod and is connected to another end of the second spring.

11. The exercise device as claimed in claim 9, wherein the first lower limb unit comprises a first block disposed on the base and adapted to be abutted against by the first connecting rod; the second lower limb unit comprises a second block disposed on the base and adapted to be abutted against by the second connecting rod.

12. The exercise device as claimed in claim 9, wherein the first exercise mechanism comprises a first damper disposed on the base and connected to the first connecting rod via a first pressure shaft; the second exercise mechanism comprises a second damper disposed on the base and connected to the first connecting rod via a second pressure shaft.

13. The exercise device as claimed in claim 1, further comprising a power generation mechanism disposed between the first exercise mechanism and the second exercise mechanism; the first exercise mechanism, the second exercise mechanism, or both of the first exercise mechanism and the second exercise mechanism swing to drive the power generation mechanism to generate an electric energy.

* * * * *